US006833410B2

(12) United States Patent
Swain

(10) Patent No.: US 6,833,410 B2
(45) Date of Patent: Dec. 21, 2004

(54) METHOD OF ROTATIONAL MOLDING USING A RESIN BLEND AND THE RESULTING MOLDED OBJECTS

(75) Inventor: Robert D. Swain, Lake Barrington, IL (US)

(73) Assignee: Chroma Corporation, McHenry, IL (US)

( * ) Notice: Subject to any disclaimer, the term of this patent is extended or adjusted under 35 U.S.C. 154(b) by 0 days.

(21) Appl. No.: 10/217,986

(22) Filed: Aug. 13, 2002

(65) Prior Publication Data

US 2003/0013814 A1 Jan. 16, 2003

Related U.S. Application Data

(63) Continuation-in-part of application No. 09/596,740, filed on Jun. 19, 2000, which is a continuation-in-part of application No. 09/418,881, filed on Oct. 15, 1999, now Pat. No. 6,433,086.
(60) Provisional application No. 60/104,507, filed on Oct. 16, 1998.

(51) Int. Cl.[7] .................... C08L 23/00; C08L 23/04; C08L 29/04; C08L 73/00; C08J 3/00
(52) U.S. Cl. .................. 525/191; 525/217; 525/221; 525/222; 525/223; 525/231; 525/232; 525/240; 525/241; 524/500; 524/502; 524/503; 524/508; 524/515; 524/522; 524/523
(58) Field of Search .......................... 525/191, 217, 525/221, 222, 223, 231, 232, 240, 241; 524/500, 502, 503, 508, 515, 522, 523

(56) References Cited

U.S. PATENT DOCUMENTS

| | | | |
|---|---|---|---|
| 3,865,284 A | 2/1975 | Kazama et al. | |
| 3,979,357 A | 9/1976 | Sayler et al. | |
| 4,115,499 A | 9/1978 | Salyer et al. | |
| 4,533,696 A | 8/1985 | Schrijver et al. | |
| 4,548,779 A | 10/1985 | Steinberg et al. | |
| 4,906,428 A | 3/1990 | Kelly | |
| 4,946,717 A | 8/1990 | Magnus | |
| 5,260,381 A | 11/1993 | Needham | |
| 5,366,675 A | 11/1994 | Needham | |
| 5,525,284 A | 6/1996 | Grimmer | |
| 5,530,055 A | 6/1996 | Needham | |
| 5,532,282 A | 7/1996 | Needham | |
| 5,783,611 A | 7/1998 | Strebel | |
| 6,410,141 B1 | 6/2002 | Grimmer | |
| 6,433,086 B1 * | 8/2002 | Swain | ........................ 525/171 |

OTHER PUBLICATIONS

Bisaria et al., "Anatomy of a Rotomolding Cycle," *Rotation*, 12–18 (Winter 1994).
Callari, Micropellets: Little Things Mean A Lot, *Plastics World*, 20–23 (Nov. 1994).
Crawford, "Causes and Cures of Problems During Rotomoulding," *Rotation* 10–14 (Summer 1994).
Dodge, "Rotational Molding—The Basic Process," *Association of Rotational Molders*, 1–13 (1995).
Grande, "Micropellets Enhance Blending Options in Vinyl Compounds," *Modern Plastics* 29–30 (Feb. 1996).
Miller, "Modernized Process Offers New Design Options," *Plastics World*, 60–64 (Jul. 1995).
"Smaller Pellets Improve Powder Grinding Efficiency and Quality," *Millennium Petrochemicals Quarterly*, 7 (1997).

* cited by examiner

*Primary Examiner*—Nathan M. Nutter
(74) *Attorney, Agent, or Firm*—Leydig, Voit & Mayer, Ltd.

(57) ABSTRACT

A method for making rotationally molded objects using resin blends. The resin blend comprises resin pellets and an amount of ground resin powder sufficient to yield rotomolded objects having desirable impact strength and other strength characteristics. Preferably, the resin blend comprises of from about 20% to about 50% by weight of ground resin powder. The resin pellets may optionally contain a reinforcing agent, and such pellets serve as a vehicle for effectively introducing desired reinforcing agents into the product being rotomolded. In addition, resin blends can be used to produce colored objects by rotational molding techniques.

26 Claims, 6 Drawing Sheets

METHOD OF ROTATIONAL MOLDING USING A RESIN BLEND AND THE RESULTING MOLDED OBJECTS

This application is a continuation-in-part of U.S. patent application Ser. No. 09/596,740 filed on Jun. 19, 2000, which is a continuation-in-part of U.S. patent application Ser. No. 09/418,881 filed on Oct. 15, 1999, now U.S. Pat. No. 6,433,086, which claims the benefit of U.S. Provisional Application No. 60/104,507 filed on Oct. 16, 1998, and a continuation-in-part of U.S. patent application Ser. No. 09/418,881 filed on Oct. 15, 1999, now U.S. Pat. No. 6,433,086, which claims the benefit of U.S. Provisional Application No. 60/104,507 filed on Oct. 16, 1998.

FIELD OF THE INVENTION

This invention relates to a method of rotational molding using a unique resin blend and to the resulting molded objects.

BACKGROUND OF THE INVENTION

Rotational molding is, in theory, a very straightforward process. To make an object using rotational molding, all that is required are: (1) a mold to hold the material in the configuration desired when the processing is complete; (2) a source of heat to melt the resin or plastic under control conditions; (3) a machine to distribute the material uniformly over the surface of the mold; and (4) a method of cooling the resin under controlled conditions.

There are several advantages which may be derived using rotational molding. The tooling costs are economical and a hollow, one-piece object results which is virtually stress-free. Uniform wall thicknesses can be provided, and there is substantial design flexibility, allowing molding of hollow, one-piece objects ranging from relatively small objects to intricate designs and to large and complex shapes.

Common rotationally molded products include, as illustrative examples, shipping drums, storage tanks and receptacles, material handling bins, and housings. Consumer products made using rotational molding range from furniture to toys and to marine accessories.

However, there are a variety of problems, difficulties and/or complications involved when using rotational molding. One significant problem derives from the process itself. The resin which is the standard commercially available is provided in relatively large-sized particles, typically in the form of pellets. The current result is that resin producers typically manufacture resins with a pellet size ranging from 35 to 60 pellets/gram. As hereinafter discussed, particles of this size do not process well given the processes currently being used by rotational molders. Accordingly, such relatively large pellets are ground to provide powders ranging from 22 mesh up to about 35 or even 50 mesh. The grinding processes involved typically result in a relatively wide bell-shaped particle distribution curve. In the rotomolding cycle, the smaller ground particles melt first, much like ground ice melts faster than ice cubes.

While such finely ground powder is widely used in the rotomolding process to achieve this faster melting quality, the use of such ground powder presents several problems. The particle size distribution achieved following grinding varies widely from one grinder to another. Indeed, sometimes the distribution curve will vary significantly even when the same grinder is used, such as, for example, which can occur when the mechanical set-up conditions are altered slightly. This variation in the particle size distribution will effect the delivery system in the rotomolding process which can cause variations in the wall thickness of the object being molded. Further, the grinding process adds not only significant expense, but can lead to inventory problems simply because of the volume of resin needed to be ground.

Still further, and importantly, the fines in such ground resin can create processing and housekeeping problems, simply due to the level of dust involved. Such resulting dust can likewise create a potential safety issue.

Yet, despite the continuing need for a solution to these very real problems, no solution exists insofar as the present inventor is aware. Rather, the resin source used in rotomolding continues to be ground powder.

Another problem associated with rotomolding has been the inability to provide a facile method of incorporating reinforcing agents, such as, for example, fiber glass, that uniformly distributes such reinforcing agents in the resultant rotomolded object. Adding such reinforcing agents in the resin-making process is usually ineffective since the strength enhancements of such agents would be substantially diminished, if not entirely lost, when the resin pellets provided by the resin manufacturer are ground prior to use in the rotomolding process. Stated differently, the strength enhancements provided by many reinforcing agents require that the shape and/or other physical form of the reinforcing agents be maintained.

Adding such reinforcing agents separately from the ground resin has been attempted. However, it is not believed that such separate addition has provided a method that can consistently achieve uniformity of strength enhancement in the rotomolded object, particularly in an economical fashion.

It would accordingly be highly advantageous if a resin blend for rotomolding could be provided that would efficiently incorporate reinforcing agents into the rotomolding process.

SUMMARY OF THE INVENTION

In general, the present invention is predicated on the discovery that a resin blend capable of achieving rotationally molded parts having impact strength and other characteristics, similar to that achieved with ground resin powder, can be obtained by eliminating much of the ground resin powder previously considered essential. More particularly, it has been found that rotationally molded parts having adequate processing and strength and other product characteristics can be obtained utilizing a blend of resin pellets in the size range obtained from the resin manufacturer while utilizing only a minor amount of ground powder.

Thus, as one example, when using a rotomold grade of polyethylene, rotomolded parts made from a resin blend containing only 20% to 50% ground resin powder and the balance resin pellets achieve low temperature impact strength characteristics essentially the same as those achieved with a rotomolded part made entirely from ground powder. This is particularly surprising, perhaps evidencing some synergistic processing and/or other properties, in view of the dramatic drop-off in properties that result when the ground powder component is reduced to 10% or less.

The present invention provides a method of rotational molding using a resin blend which avoids the problems of prior rotational molding techniques that employ ground resin powder. These and other advantages of the present invention, as well as additional inventive features, including the ability to effectively and efficiently incorporate reinforcing agents into the rotomolding process, will be apparent from the description of the invention provided herein.

DETAILED DESCRIPTION OF THE INVENTION

Figure 1:
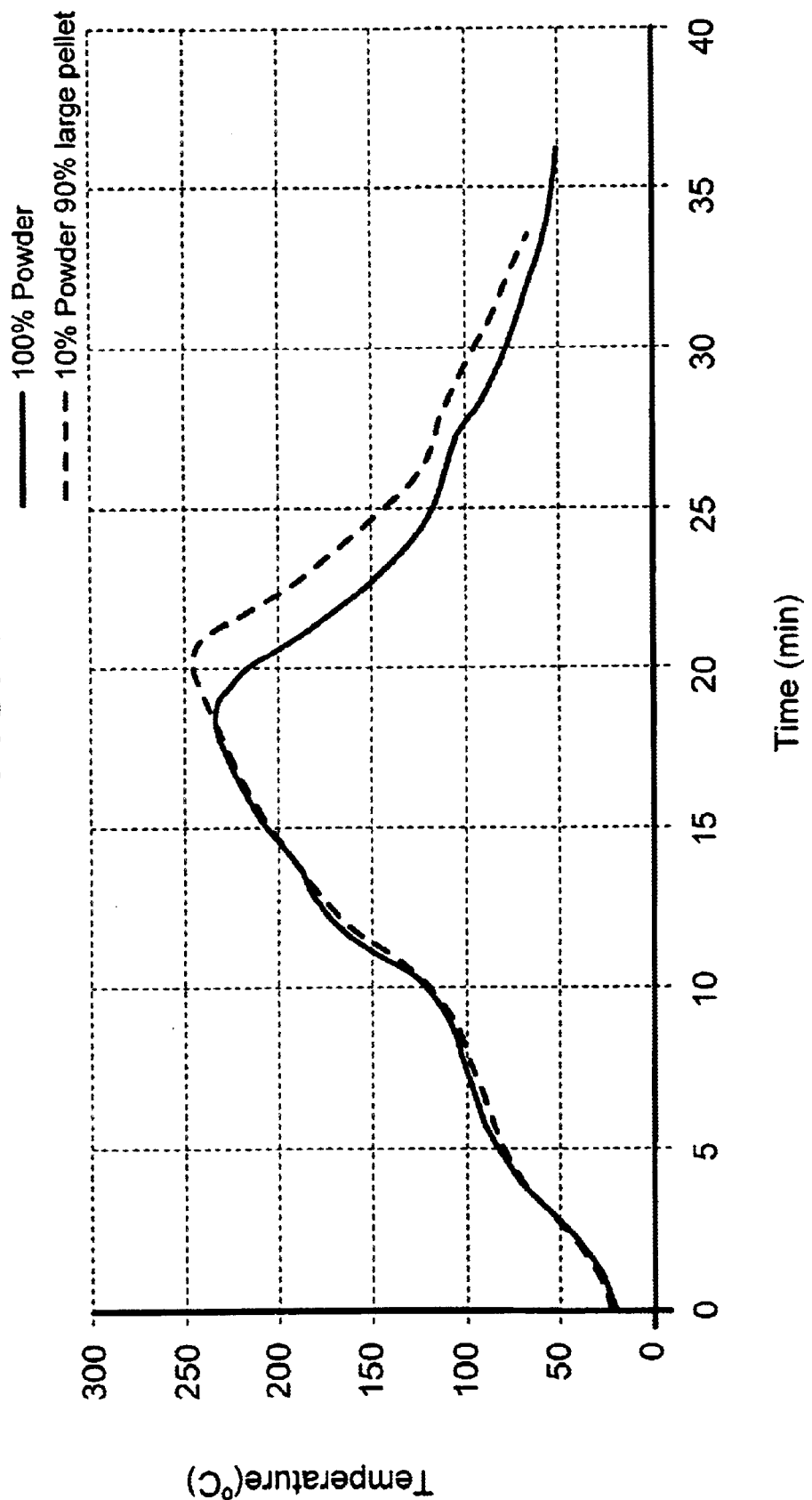
FIG. 1 is a plot of the air temperature profile in a uniaxial rotomolding machine as a function of time for various resins.

Typically, resins such as LLDPE resins (linear low-density polyethylene) are currently manufactured in a standard commercial pellet count of about 35 to 60 pellets/gram, as previously noted. While such pellets may be utilized to create rotationally molded parts, it has been found that such relatively large sized pellets will provide undesirable properties for direct use in rotationally molding, including the fabrication of composite laminates because of the melting and coalescence characteristics of such larger pellets. More particularly, composite laminates can be molded using different polymers or the same polymer with different physical properties and/or characteristics. The pellet size affects the ability of the polymer to melt out and achieve optimum particle coalescence. The molding process, including the selection of polymer having an appropriate particle size, is intended to achieve optimum adhesive and physical properties both within and between the composite laminate materials. However, as will be discussed hereinafter, the present invention utilizes a blend comprising predominantly such resin pellets.

Any type of resin used in conventional rotational molding may be utilized. The particular resin selected will be determined by the requirements for the object or part being rotationally molded. Currently, the most common resin used is polyethylene. Many types of polyethylene are commercially available, with a wide range of properties and all may be used. In general, the types of polyethylene available can be described as linear low-density polyethylene, low-density polyethylene, medium-density polyethylene, and high-density polyethylene. Still further, each material type is manufactured using unique technology to achieve desired material physical characteristics and properties. Examples of these are hexene, butene, and metallocene molecular chains used in resin technologies.

In addition, other polyolefins are known and may be used including, for example, polypropylene. Further, ethylene-vinyl acetate resins can be used.

Still further illustrative examples of other types of resins useful in the method of this invention include polycarbonates, nylons, polyvinylchlorides, and polyesters. Additional useful resins include ABS, acetals, acrylics, cellulosics, epoxies, fluorocarbons, phenolics, polystyrenes, polyurethanes, SAN polymers, and silicone polymers. Mixtures of any of the various resins discussed herein may also be used.

Typically, any useful colorants may be used to provide the desired colors for the particular product being molded. Any heat stable and unreactive colorants known and available for use for the particular resins may be employed. As illustrative examples, virtually any color can be provided, ranging from white to yellow, red, orange, green, burgundy and black.

Illustrative examples of useful colorants include titanium dioxide, carbon black, iron oxide, ultramarine blue, cadmium sulfide, phthalocyanine green, phthalocyanine blue, chromium oxide, quinacridone red, anthraquinone and perinone dyes. The amount of colorant used can be varied as is necessary to provide the desired color. In general, the amounts used will vary from about 0.1% to about 3%.

In addition, any other additives may be employed as optional ingredients as is known from conventional rotational molding. For example, it may be desirable to provide a tackifying agent to, in effect, allow the colorant to coat the resin particles. Many suitable tackifying agents are known, and white mineral oil is useful. The amount utilized should be only at the level desired to provide the requisite tackifying effect to avoid any possible undue adverse effects on the physical properties of the molded article or object. Other optional additives include dispersing agents, UV stabilizers and/or antioxidants in the amount that are known to provide the desired effects.

Pursuant to the present invention, and in marked contrast with currently used ground resin charges, the present invention utilizes a resin blend comprising predominantly resin pellets in the size provided by the resin manufacturer together with a minor amount of ground resin powder. The amount of ground powder need only be that level sufficient to yield rotomolded parts having the desired impact strength and other strength properties. The amount of ground powder needed to provide the desired strength characteristics can vary depending upon the resin and the size of the resin pellets available. When the proportion of the ground resin powder component is present at too low a level, a significant drop-off in the desired properties will often result. On the other hand, due to the problems created by utilizing ground powder, there is no functional reason to employ levels of ground powder in excess of those needed to satisfy the processing and molded part characteristics desired for the particular application.

To this end, rotomolding grade resins, particularly polyolefin resins, such as polyethylene, can achieve suitable processing and product characteristics by employing a resin blend comprising only about 20% to about 50% or so of the ground resin powder by weight, the percent being based upon the total weight of the blend. Resin pellets constitute the remainder of the resin blend. This amount of ground resin powder in the resin blend should be useful where the resin pellets employed range from about 35 to about 60 pellets per gram or so. Preferably, the ground resin powder is present in an amount of about 20% to about 40% by weight based on the total weight of the resin blend and, most preferably, no more than about 30% by weight based on the total weight of the resin blend. It is expected that the level of ground powder needed will increase somewhat, with larger-sized pellets. As may be appreciated, the pellet size, if desired, can be above or below the typical 35 to 60 range. Indeed, by adjusting the pellet size it may be desirable to optimize the desired characteristics of the molded object.

In accordance with a further aspect of the present invention, the resin blends used can serve as an effective and efficient vehicle for incorporating a reinforcing agent to enhance the strength or other desired physical characteristics of the rotomolded object. The resin pellets used in the present invention thus may optionally include a reinforcing agent added to modify the physical properties such as, for example, strength characteristics and barrier properties, of the rotomolded objects produced according to the present invention.

Any reinforcing agent which permits the manufacture of rotomolded objects having desirable physical properties may be used. Importantly, the amount of reinforcing agent in the resin pellet should allow for the uniform distribution of the reinforcing agent in rotational moldings. Inorganic or organic fibers are appropriate reinforcing agents. Such fibers include, for example, glass fibers, carbon fibers, aramid fibers, polyester fibers, polypropylene fibers, and polyethylene fibers. One type of aramid fiber suitable in the present invention is poly (p-phenylene terephthalamide) marketed under the tradename Kevlar® by DuPont. Mineral fillers such as, for example, glass beads, calcium carbonate, talc, clay, silicate, and mica, may also be utilized. Metal alloys and other alloys may be used.

Particularly useful reinforcing agents of the carbon fiber type include carbon nanofibers (i.e., hollow fibers) which can greatly enhance the strength characteristics of the rotomolded object. Such fibers need to maintain their structure to avoid substantial disruption of the strength enhancements that otherwise can be provided to the rotomolded product. Introducing such carbon nanofibers in a prewetted fashion, i.e., incorporated into the resin pellets used in the present invention, thus preserves the strength enhancements imparted by such fibers to the ultimate rotomolded product.

Alternatively, thermoplastic materials having a sufficient high melting point may be employed. Glass fibers are preferably utilized as a reinforcing agent. The various reinforcing agents discussed herein may be used alone or in combination with other reinforcing agents in a mixture where the reinforcing agents are compatible with one another.

The amount of reinforcing agent present in the resin pellet is governed by its function. That is, the reinforcing agent should be present in an amount sufficient to yield rotomolded objects having the desired physical characteristics, e.g., one or more of strength, stiffness, impact and flexural strength, and improved heat distortion properties. Accordingly, in general, the concentration range of the reinforcing agent in the resin pellet is from about 10 to about 80 by weight of the resin pellet. Preferably, the concentration of the reinforcing agent in the resin pellets is from about 20 to about 70 by weight of the resin pellet. The concentration range of the reinforcing agent as a percentage of the resin blend is generally from about 5 to about 50 by weight based on the total weight of the resin blend.

When inorganic fillers are utilized as the reinforcing agent, the concentration range of inorganic filler in the resin pellet is from about 20% to about 50%. In particular, when glass fibers are employed, the concentration of glass fiber in the resin pellet is preferably from about 20% to about 30%. If desired, the fiber glass used may be coated to enhance bonding with the resin being used. As an illustrative example, coating with maleic anhydride may be utilized for polyolefins, such as, for example, polyethylene resins.

In this fashion, the flex modulus of the rotomolded article can be enhanced. Also, when the resin being used is linear low polyethylene, the inclusion of suitable reinforcing agents (e.g., fiber glass) can enhance the heat distortion temperature characteristics of the rotomolded article.

A sizing agent may optionally be used when an inorganic filler is incorporated as a reinforcing agent into the resin pellets. The sizing agent, also commonly referred to as a coupling agent, improves the bonding strength between the inorganic and organic phases in the resin pellets. Preferred sizing agents include organo-functional silanes. Rotationally molded plastic parts made from resin blends in which the resin pellets contain a sizing agent generally exhibit enhanced physical properties, such as increased tensile strength. Sizing agents may be added to resin pellets containing reinforcing agents in any suitable manner. For example, a sizing agent may be applied to the reinforcing agent first. The treated reinforcing agent is then incorporated into the resin pellets, for example, by a pultrusion process, such a process being known in this field.

In addition to variations in concentration, the shape and size of the reinforcing agent may vary depending upon the shape and size of the resin pellets in which the reinforcing agent is contained. For example, the inorganic and organic fibers may be long fibers, short fibers, or mixtures thereof. The reinforcing agent may be monofilaments that are twisted together. When in the shape of fibers, the reinforcing agent may have any suitable diameter such that the fibers uniformly distribute along the wall of the mold of the rotational molding machine. Preferably, the fiber glass utilized is in the form of fibers varying from about ¼ inch to about ½ inch.

Resin pellets containing a reinforcing agent useful in the present invention may be produced in any suitable manner. Preferably, the reinforced resin pellets are produced by a pultrusion process so that the pellets have continuous profiles. In the pultrusion manufacturing technique, continuous fibers of the reinforcing material are pulled through molten resin and then through a series of wiper rings to remove any excess resin. The fiber-resin mixture is then pulled through a spider which separates and evenly distributes the fibers before passing into a die. The material is then heated in a die resulting in gelation and curing of the resin. A cut-off device trims the pultruded product to produce pellets having the required lengths.

The resin pellets useful in the present invention may have any suitable shape which is capable of forming a rotomolded object having desirable physical characteristics. Useful resin pellet shapes include, for example, thin ribbons, rectangles, cubes, oval saucers, spheres, cylinders, rods, wedges, and cones. Alternatively, the resin pellets may have non-uniform shapes. Mixtures of resin pellets having different shapes may also be used. Resin pellets that are solid, hollow or a mixture thereof are suitable for use in the present invention.

The concentration of ground resin powder in the resin blend necessary to yield rotomolded objects exhibiting suitable physical properties (i.e., tensile strength, impact strength, etc.) may be influenced by the shape of the resin pellets utilized and resulting voids present in a mixture of the pellets. That is, a mixture of resin pellets having relatively larger void spaces between pellets, such as, for example, rectangular and cube shaped resin pellets, requires more powder to fill the voids between the pellets. On the other hand, a mixture of resin pellets have relatively smaller void spaces between pellets, such as, for example, oval saucer-shaped pellets, requires less powder to fill the void spaces between pellets.

More particularly, it has been found that, when the pellets used are shaped as oval saucers (i.e., cylindrical disks) as little ground resin as 30% by weight will generally provide rotomolded products with strength characteristics generally equivalent to those obtained using only ground resin. On the other hand, pellets of other shapes can require up to 50% by weight of the total resin to achieve equivalent strength characteristics.

The particle size of the ground resin powder suitable for use in the present resin blend may vary. The ground resin powder may include fine particles, coarse particles, or micropellets. Preferably, the ground powder has a relatively uniform particle size. Alternatively, mixtures of fine particles, coarse particles and micropellets may be utilized. Suitable fine particles generally have a particle size range from about 10 mesh to about 35 mesh. Suitable coarse particles generally have a particle size range from about 35 mesh to about 50 mesh. Suitable micropellets generally have a particle size range from about 0.010" to about 0.030" (about 2 microns to about 8 microns). The particular size of ground resin powder used in the resin blend of the present invention can be modified to achieve a rotomolded object having desire physical properties.

The reasons for what are considered to be the surprising results achieved are not fully understood. These results may evidence a complex relationship involving such processing aspects as coalescence mechanisms resulting from what perhaps may be considered as a zero shear rotomolding fabricating process as the resin blend undergoes the melting process and is transferred in molten form to the inner wall of the mold. Thus, the manner in which the powder component of the resin blend is transferred to the inner wall of the mold appears to have a synergistic effect on the physical properties of the resulting rotomolded object.

In any event, the advantages of the present invention are varied and substantial. First of all, the use of the present invention eliminates the necessity of having to grind the vast majority of the resin required to make a rotomolded part, offering a significant cost reduction for the molder. The housekeeping expenses incurred by rotomolders are significantly reduced because of the lessened volume of dusty powder that needs to be handled. Still further, and importantly, the uniform particle distribution of the resin pellet typically available from the resin manufacturer produces what is considered to be a synergistic delivery mechanism which allows molding of objects of a more uniform wall thickness than can be easily obtained with the use of the conventional ground resin charge.

Another important aspect of the present invention concerns the significant improvements that can be obtained for rotomolded objects that are colored. At present, the industry pigments resins in one of two manners. One approach is to utilize precolored material. More particularly, the polymer is colored in the extrusion compounding operation and is thereafter extruded into a pellet configuration that is later converted into a powder by the grinding process. The other approach is to use dry color pigments added to ground natural resin during the rotomolding process.

Pursuant to one aspect of this invention, an alternate method of achieving a colored rotomolded object is provided which is not considered achievable at present. To this end, the present invention contemplates increasing the level of pigmentation in the ground resin component of the resin charge so as to provide increased opacity, i.e., provide the ground resin component with all the color required for the rotomolded product. In this fashion, the rotomolder should be able to utilize natural resin pellets, viz., pellets which have not been precolored. With this approach, a considerable reduction in cost can be achieved. Even further, the present invention permits rotomolders presently using dry pigments to color their resins with an alternate method of coloration at a cost comparable to the present cost of dry coloring. Additionally, the use of the present invention to achieve a colored, rotomolded object, in contrast to current dry coloring techniques, reduces the housekeeping expense and eliminates cross-color contamination created by airborne dry pigment particles.

Still another important aspect of this invention is that desirable reinforcing agents such as, for example, fiber glass and carbon nanofibers, can be effectively and efficiently added, achieving a rotomolded product of enhanced strength characteristics. Employing the resin pellets as a vehicle for introducing a variety of reinforcing agents thus allows product enhancements not previously possible in rotomolding.

The following examples further illustrate the present invention but, of course, should not be construed as in any way limiting its scope.

EXAMPLE 1

This Example demonstrates the characteristic inside air temperature profile in a uniaxial rotomolding machine for both a 100% powder resin and a 10% powder/90% large pellet resin blend used according to the method of the present invention.

A square mold was filed with 100 g of preweighed polymer. A uniaxial rotomolding machine was set to rotate at 4 rpm. After the mold rotation began, an infra-red oven (preheated to 408° C.) was placed over the mold. The inside air temperature was then recorded over a series of timed intervals. The heating cycle was stopped (i.e., the oven was removed) when the inside air temperature reach 239° C. (expect for the 100% powder resin). The plots of the inside air temperature versus time for both the 100% powder resin and 10% powder/90% large pellet resin blend are shown in FIG. 1. As can be seen, the heating cycle was completed earlier when the 10% powder/90% large pellet resin blend was used.

EXAMPLE 2

This Example compares the mechanical properties including impact resistance and tensile strength of rotomolded objects made using resin blends according to the method of the present invention as compared to such impact resistance and tensile strength of rotomolded objects produced using other resins.

Six rotomolded samples were prepared by rotomolding polyethylene resins and resin blends on a computer controlled M20 FSP Clamshell machine. The temperature and residence time for the gas-fired oven were set at 310° C. and 3 minutes, respectively.

The large pellets of polyethylene resin used to prepare Samples 1–5 are made of a rotomolding grade polyethylene resin identified as Lot # MP 635–661. The micropellets used to prepare Sample 6 are made of an injection molding grade polyethylene resin identified as Lot # LL-6407. The composition of the resin blend used to produce these samples and the sample densities are shown in Table 1 below:

TABLE 1

| Sample | Resin Formulation | Density (g/cc) |
| --- | --- | --- |
| 1 | 100% powder | 0.936 |
| 2 | 10% powder<br>90% large pellet | 0.936 |
| 3 | 20% powder<br>80% large pellet | 0.936 |
| 4 | 30% powder<br>70% large pellet | 0.936 |

TABLE 1-continued

| Sample | Resin Formulation | Density (g/cc) |
|---|---|---|
| 5 | 100% large pellet | 0.936 |
| 6 | 100% micropellets | 0.935 |

Figure 2:
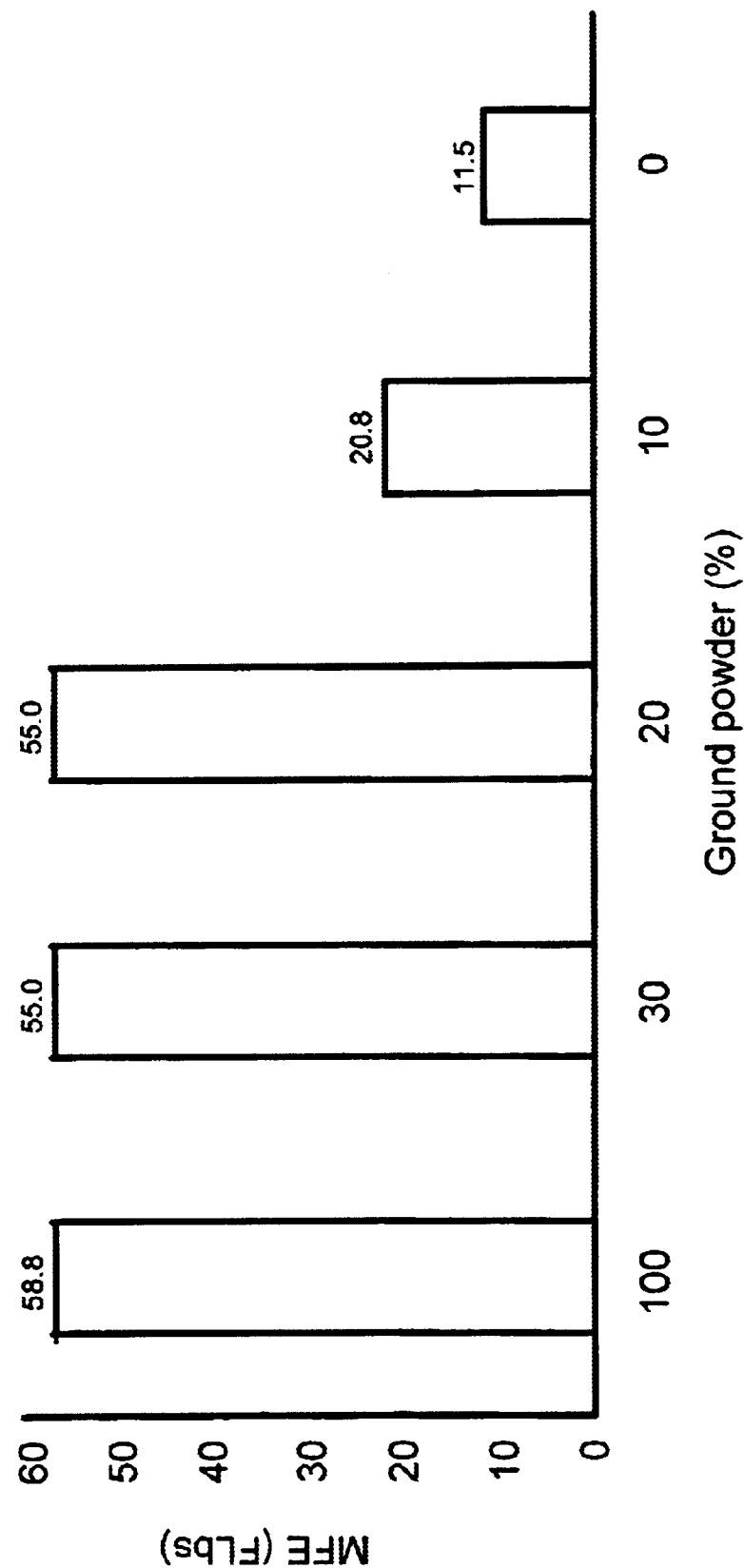
FIG. 2 is a graph showing the low temperature impact resistance of rotomolded objects by plotting main failure energy for various powder concentrations in the resin blend used to produce the rotomolded objects.
Figure 3:
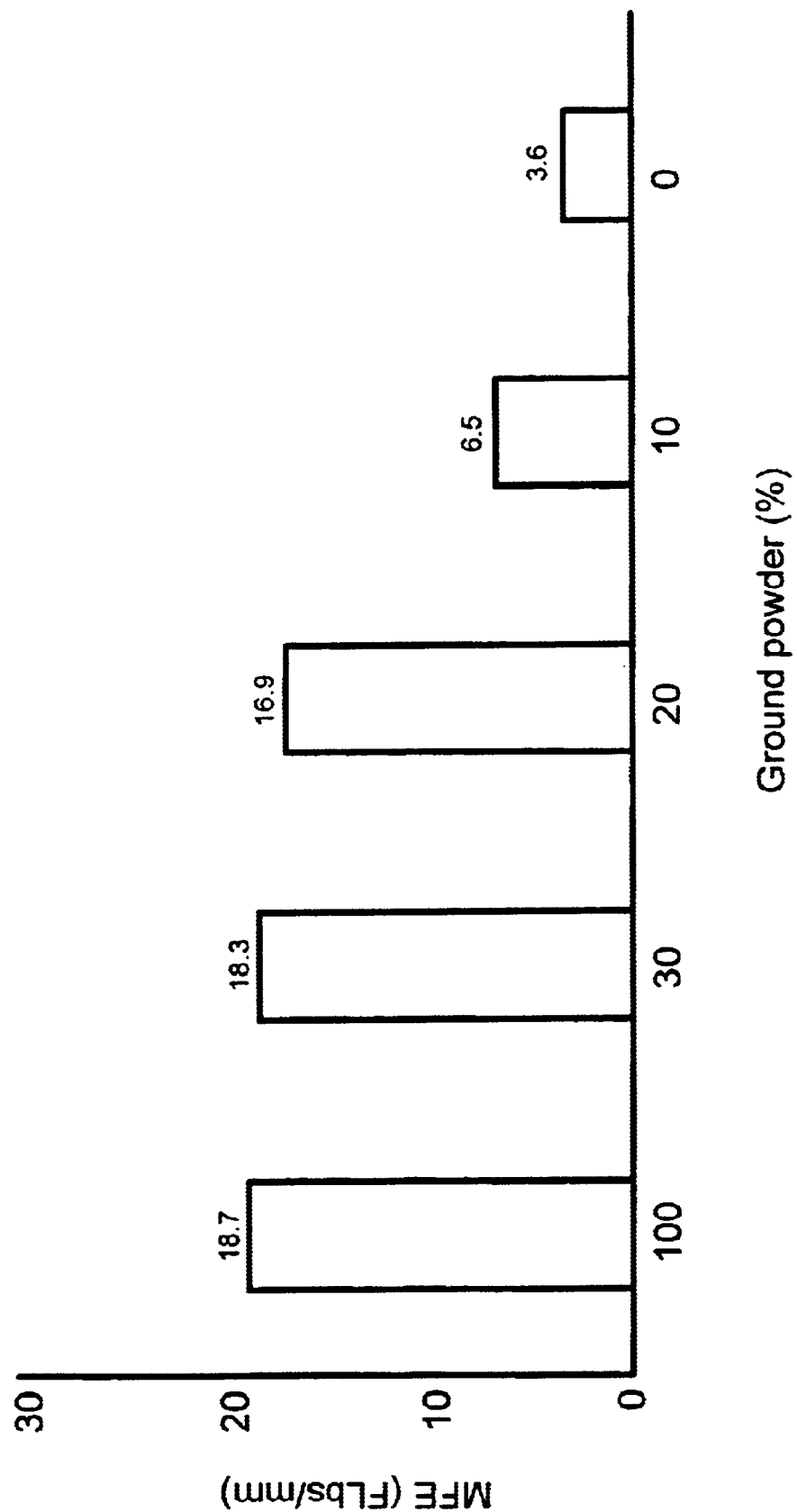
FIG. 3 is a graph showing the normalized (for unit thickness) low temperature impact resistance of rotomolded objects by plotting main failure for various powder concentrations in the resin blend used to produce the rotomolded objects.

The rotomolded objects in Samples 1–5 were subjected to a low temperature dart impact test. This impact test, also known as the A.R.M. method, determines the energy required to cause failure of the rotomolded part using a free falling dart. Samples of the rotomolded parts were placed into a sample holder with the inside surface of the part facing down. The dart was raised to a height expected to cause half of the samples to fail. The graph of main failure energy for Samples 1–5 is shown in FIG. 2. The graph of main failure energy normalized for the average sample thickness in Samples 1–5 is shown in FIG. 3. Sample 6 prepared from an injection grade polyethylene resin had no impact strength.

As can be seen in FIGS. 2 and 3, equivalent low impact strength characteristics are achieved using a resin blend containing 20% or 30% powder when compared to a molded part made entirely with ground resin powder (i.e., 100% powder). A substantial drop off in impact strength was observed when the level of ground resin powder was reduced to 10% or eliminated altogether (i.e., 100% large pellets). In addition, the rotomolded object prepared from a 30%. powder blend (Sample 4) was observed to have a nice surface finish as compared to objects made using resins with decreased ground powder content which has uneven surfaces with holds.

The rotomolded objects of Samples 1, 4 and 6 were subject to a tensile strength analysis. The tensile strength (at yield), percent elongation at break and tensile stress (at break) for these objects are shown in Table 2 below:

TABLE 2

| Sample | Tensile Strength @ yield (MPa) | Percent Elongation @ break (%) | Tensile Stress @ break (MPa) |
|---|---|---|---|
| 1 | 22.00 | 1148 | 21.55 |
| 4 | 21.35 | 1094 | 20.85 |
| 6 | 16.63 | 483 | 5.96 |

Figure 4:
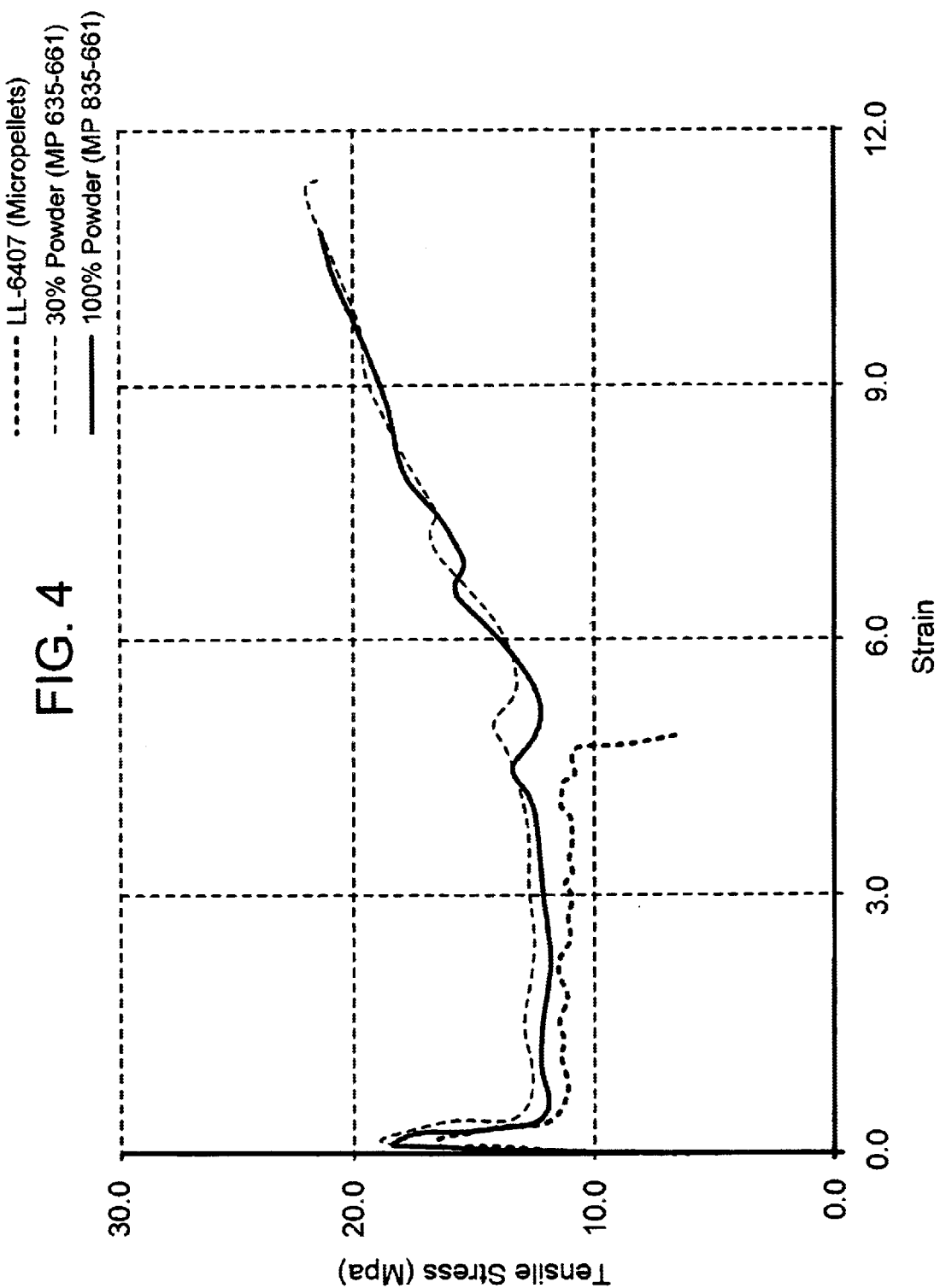
FIG. 4 is a stress versus strain curve of rotomolded objects obtained using various resin blends.
Figure 5:
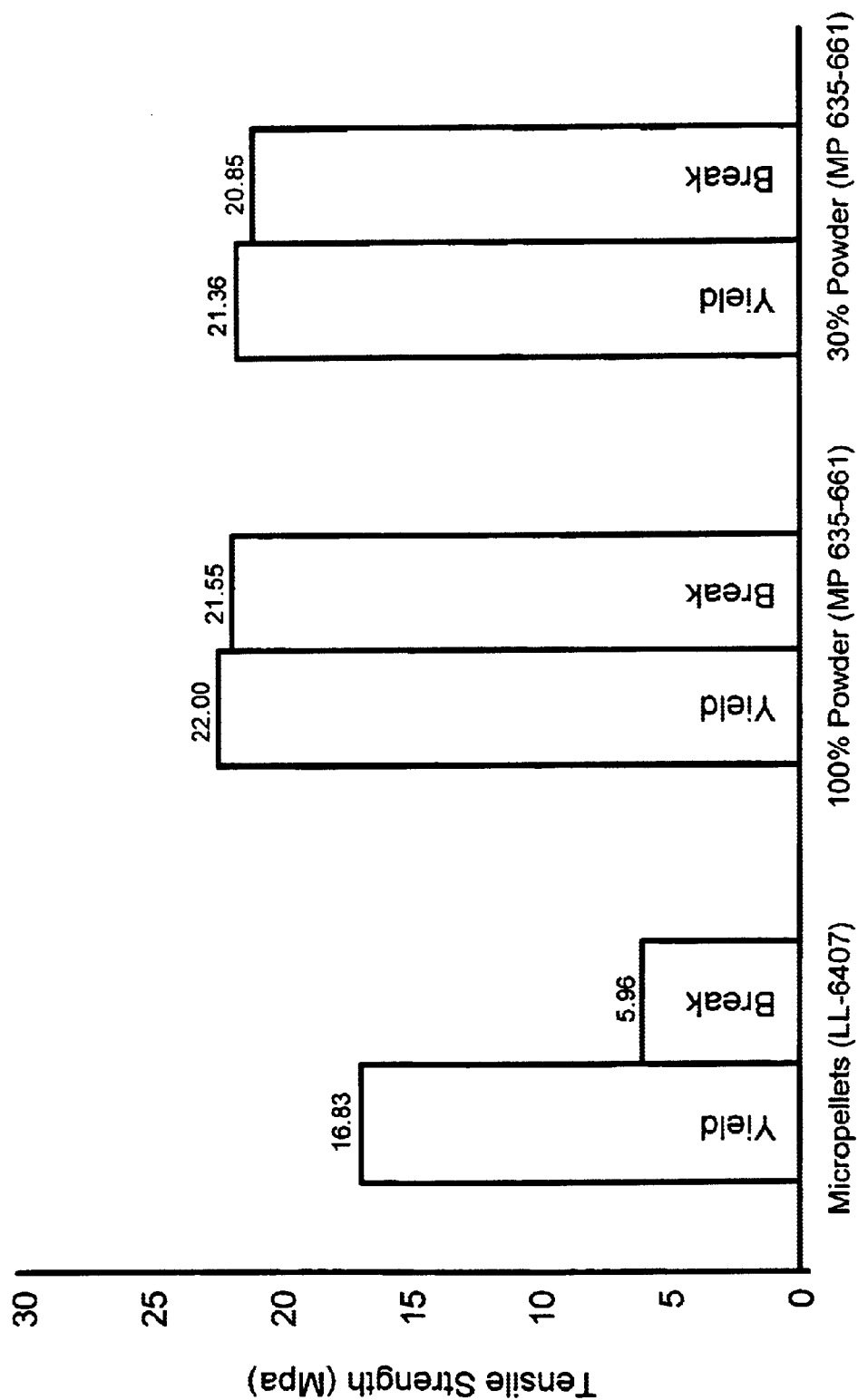
FIG. 5 is a graph showing the tensile strength of rotomolded objects obtained using various resin blends.
Figure 6:
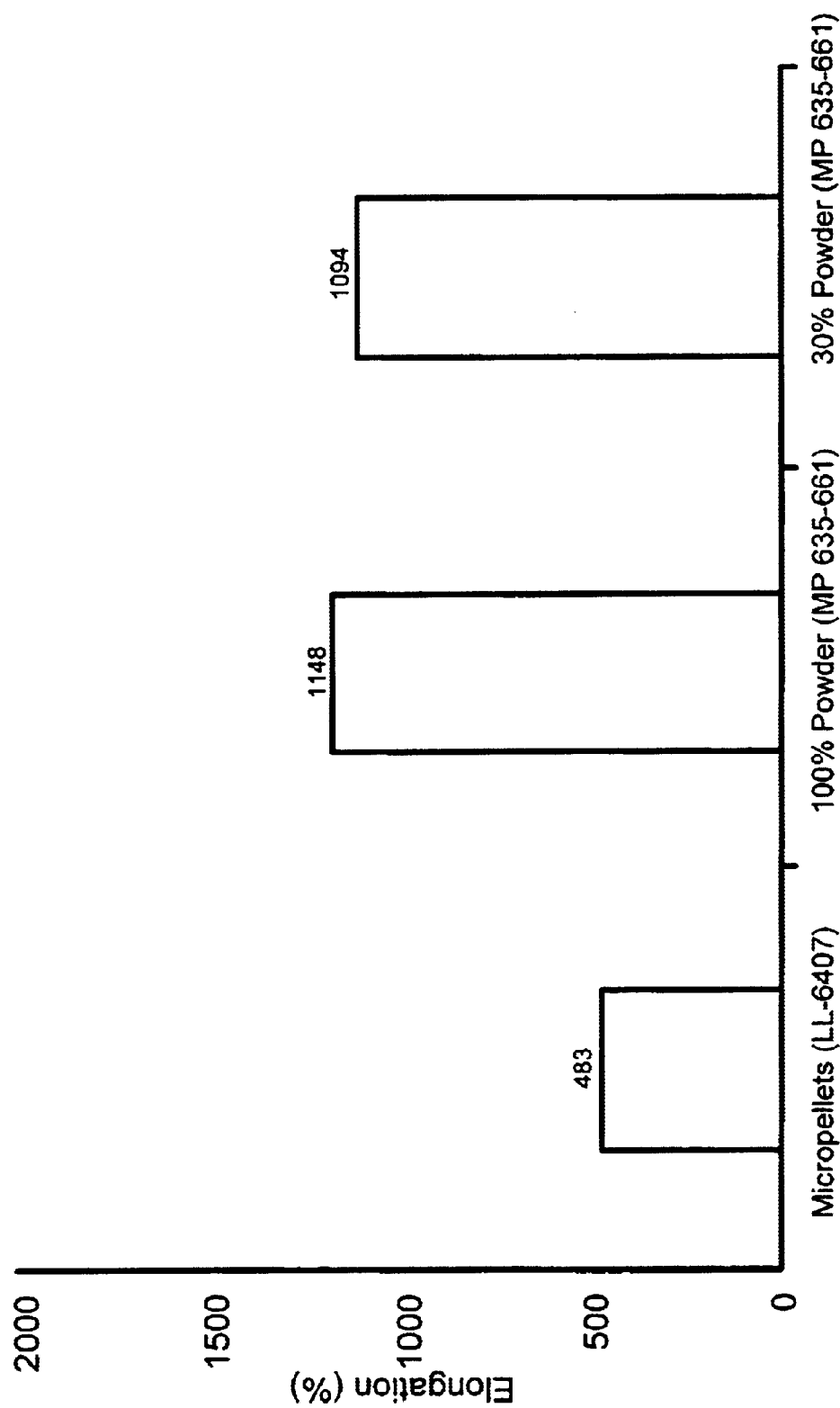
FIG. 6 is a graph showing the percent elongation at break of rotomolded objects obtained by various resin blends.

The plots of tensile stress versus strain for these three rotomolded samples are shown in FIG. 4. The tensile strengths at yield and at break for Samples 1, 4 and 6 which are set forth in Table 2 are likewise plotted in FIG. 5. The graph in FIG. 6 illustrates the percent elongation at break for rotomolded Samples 1, 4 and 6 as set forth in Table 2.

As can be seen from this tensile strength analysis, the rotomolded object produced by a 30% powder blend according to the present invention achieves tensile strength characteristics equivalent to those obtained using a conventional rotomolding charge, viz., 100% resin powder.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A resin blend composition for use in rotational molding comprising resin pellets and ground resin powder made of the same resin to yield a single-layered rotomolded object, wherein said ground resin powder is present in an amount of from about 20% to about 50% by weight based on the total weight of the resin blend composition, and wherein said resin pellets include a reinforcing agent.

2. The resin blend composition of claim 1, wherein said ground resin powder is present in an amount of from about 20% to about 30% by weight based on the total weight of the resin blend composition.

3. The resin blend composition of claim 2, wherein said ground resin powder is present in an amount of about 30% by weight based on the total weight of the resin blend composition.

4. The resin blend composition of claim 1, wherein said ground resin powder is present in an amount of no more than about 30% by weight based on the total weight of the resin blend composition.

5. The resin blend composition of claim 2, wherein said resin pellets and ground resin powder are polyethylene.

6. The resin blend composition of claim 5, wherein said resin pellets and ground resin powder are linear low-density polyethylene.

7. The resin blend composition of claim 1, wherein the concentration of said reinforcing agent in the resin pellets is from about 10% to about 80% by weight of the resin pellets.

8. The resin blend composition of claim 7, wherein said reinforcing agent is selected from the group consisting of inorganic fibers, organic fibers, and mineral fillers.

9. The resin blend composition of claim 8, wherein said reinforcing agent is inorganic fibers.

10. The resin blend composition of claim 9, wherein said inorganic fibers are glass fibers.

11. A resin blend composition for use in rotational molding comprising resin pellets and ground resin powder made of the same resin to yield a first single-layered rotomolded object, wherein said resin pellets include a reinforcing agent, and wherein said ground resin powder is present in a sufficient amount such that the first rotomolded object has strength characteristics substantially similar to a second rotomolded object produced from a resin composition containing 100% ground resin particles.

12. The resin blend composition of claim 11, wherein the resin pellets and ground resin powder are made of the same resin.

13. The resin blend composition of claim 11, wherein the tensile strength at yield of the first rotomolded object is about 20 mPa.

14. The resin blend composition of claim 11, wherein the percent elongation at break of the first rotomolded object is about 1100%.

15. The resin blend composition of claim 11, wherein the tensile stress at break of the first rotomolded object is about 20 mPa.

16. The resin blend composition of claim 11, wherein the concentration of said reinforcing agent in the resin pellets is from about 10% to about 80% by weight of the resin pellets.

17. The resin blend composition of claim 16, wherein the concentration of said reinforcing agent in the resin pellets is from about 20% to about 50% by weight of the resin pellets.

18. The resin blend composition of claim 16, wherein said reinforcing agent is selected from the group consisting of inorganic fibers, organic fibers, and mineral fillers.

19. The resin blend composition of claim 18, wherein said inorganic fibers are glass fibers.

20. The resin blend composition of claim 11, wherein said reinforcing agent is selected from to group consisting of inorganic fibers, organic fibers, and mineral fillers.

21. The resin blend composition of claim 20, wherein said reinforcing agent is inorganic fibers.

22. The resin bland composition of claim 21, wherein said inorganic fibers are glass fibers.

23. A resin blend composition for use in rotational molding comprising resin pellets and ground resin powder made of the same resin to yield a single-layered rotomolded object, wherein said resin pellets include a reinforcing agent and wherein the rotomolded object has a tensile strength at yield of about 20 mPa, a percent elongation at break of about 1100%, and a tensile stress at break of about 20 mPa.

24. The resin blend composition of claim 23, wherein said reinforcing agent is selected from the group consisting of inorganic fibers, organic fibers, and mineral fillers.

25. The resin blend composition of claim 24, wherein said reinforcing agent is inorganic fibers.

26. The resin blend composition of claim 25, wherein said inorganic fibers are glass fibers.

* * * * *